No. 791,186. Patented May 30, 1905.

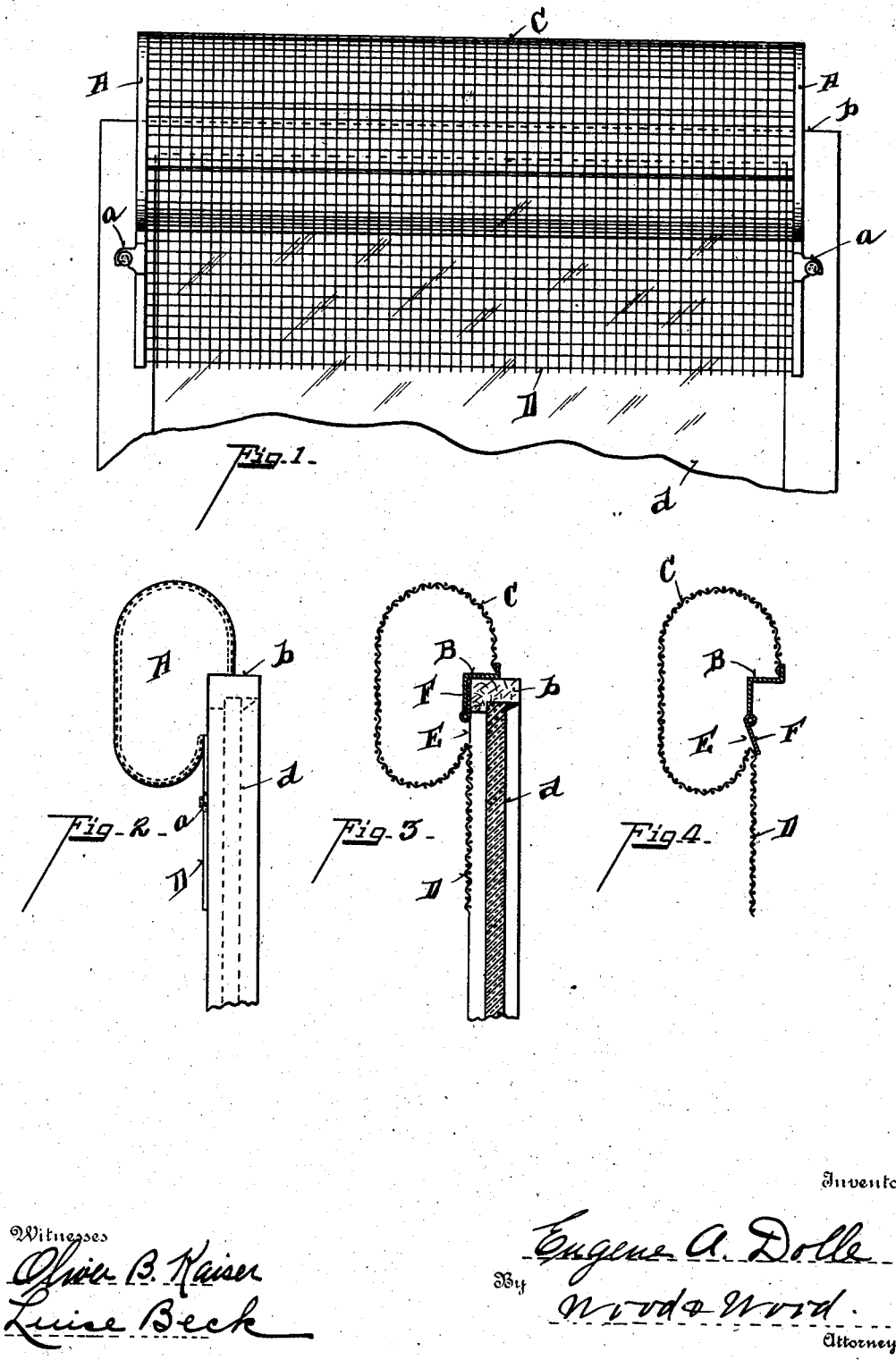

UNITED STATES PATENT OFFICE.

EUGENE A. DOLLE, OF CINCINNATI, OHIO.

INSECT-TRAP.

SPECIFICATION forming part of Letters Patent No. 791,186, dated May 30, 1905.

Application filed May 20, 1904. Serial No. 208,803.

*To all whom it may concern:*

Be it known that I, EUGENE A. DOLLE, a citizen of the United States, residing at Cincinnati, in the county of Hamilton and State of Ohio, have invented certain new and useful Improvements in Insect-Traps, of which the following is a specification.

My invention relates to a fly-trap adapted to be used on a window.

The object of my invention is to provide a fly-trap which will effectually catch all the flies and insects in the room and which can be easily and quickly manipulated.

The features of my invention are more fully set forth in the description of the accompanying drawings, forming a part of this specification, in which—

Figure 1 is a front elevation of my trap attached to a window in position for use. Fig. 2 is an end elevation of the trap and window-frame in elevation. Fig. 3 is a central vertical cross-section of Fig. 1. Fig. 4 is a similar section of the trap alone with the flap closed.

In the preferred form of construction the fly-trap is attached to the upper rail of the lower sash of the common window or screen, which is the most convenient method of constructing and using the trap.

The trap proper is constructed as follows:

A A represent heads, preferably made of metal, to which the shell of the trap is attached. When the trap is to be attached to the sash-rail or screen-frame, it is formed with an offset.

B represents an angular frame-piece secured to the head and forming a support and resting upon the window or screen frame $b$.

C represents wire-gauze, of which the shell of the trap is formed, which is attached to head-pieces.

D represents the downward extension of the gauze forming an apron or fender.

$a$ represents ears extending from the apron for securing the trap in position.

E represents an opening at the top of the apron leading into the shell of the trap.

F represents a flap-door hinged to the frame B and adapted to drop down and close the opening E. When the trap is placed in position on the window or screen, this flap or door is folded up, so as to leave the opening unobstructed.

As shown in Fig. 3, the apron D is some distance away from the pane of glass or screen $d$ for the purpose which will now be explained.

Suppose a room having several windows, all of which are darkened but one and that one at the top portion thereof. The flies in the room will fly toward the light and they will alight upon the pane of glass or screen and will crawl up the glass. By having the apron D some distance away from the glass they will pass up under the apron and when they reach the highest point will fly away, if the trap be not in position; but if the trap be in the position shown the flies will pass up into the shell of the trap and settle in the upper portion thereof. When it is desired to remove the flies in the trap, the trap is lifted off of the sash, the flap-door is dropped down, and the flies imprisoned in the trap.

I have found by repeated trials that in a very short time and used in the method herein described substantially all the flies in the room will readily be caught in the trap.

It is manifest that the trap might be applied to the window at other points from the sash-rail, provided the apron is held at a sufficient distance from the pane to permit the flies to crawl up behind it and so pass into the shell of the trap; but the form herein shown is the simplest and best.

Having described my invention, I claim—

1. An insect-trap composed of a suitable frame, a gauze shell secured thereto and provided with an elevated opening along one wall of the shell, a depending gauze apron connected to the shell at the lower edge of the opening, and a flap-door hinged to the frame and adapted to close the opening, substantially as described.

2. An insect-trap composed of a frame having an offset portion adapted to rest upon the sash-rail of a window, a gauze shell secured to the frame and having a horizontal opening along the wall and below the offset, a flap-door hinged to the bottom of said offset and adapted to close the opening in the shell, and an apron depending downwardly from the lower edge of said opening, substantially as described.

In testimony whereof I have hereunto set my hand.

EUGENE A. DOLLE.

Witnesses:
OLIVER B. KAISER,
LUISE BECK.